United States Patent [19]

Davis

[11] Patent Number: 4,495,069
[45] Date of Patent: * Jan. 22, 1985

[54] DRAIN SYSTEM FOR FUEL PROCESSOR APPARATUS

[75] Inventor: Leland L. Davis, Saline, Mich.

[73] Assignee: Davco, Inc., Ann Arbor, Mich.

[ * ] Notice: The portion of the term of this patent subsequent to Jan. 18, 2000 has been disclaimed.

[21] Appl. No.: 463,041

[22] Filed: Feb. 1, 1983

Related U.S. Application Data

[63] Continuation-in-part of Ser. No. 287,149, Jul. 27, 1981, which is a continuation-in-part of Ser. No. 188,875, Sep. 19, 1980, Pat. No. 4,368,716, and a continuation-in-part of Ser. No. 435,681, Oct. 21, 1982, Pat. No. 4,421,090, which is a continuation of Ser. No. 188,875, Sep. 19, 1980, Pat. No. 4,368,716.

[51] Int. Cl.³ .................. F02M 31/00; B01D 23/00
[52] U.S. Cl. .................. 210/114; 210/149; 210/181; 210/184; 123/557
[58] Field of Search ............ 210/114, 116, 123, 181, 210/184, 149; 123/142.5 E, 142.5 A, 142, 557

[56] References Cited

U.S. PATENT DOCUMENTS

| | | |
|---|---|---|
| 14,386 | 3/1856 | Blair . |
| Re. 26,186 | 4/1967 | McQuerry ............ 165/71 |
| 916,003 | 3/1909 | Osborn . |
| 1,133,845 | 3/1915 | Farnsworth . |
| 1,318,068 | 10/1919 | Giesler . |
| 1,623,074 | 4/1927 | Tartrais ............... 123/557 |
| 1,835,441 | 12/1931 | Suchy et al. . |
| 1,866,970 | 7/1932 | Garland et al. . |
| 2,068,395 | 1/1937 | Burckhalter et al. ..... 210/184 |
| 2,070,189 | 2/1937 | Webster . |
| 2,084,743 | 6/1937 | Rathbun . |
| 2,289,610 | 7/1942 | Wallace ............... 210/746 |
| 2,348,670 | 5/1944 | Woodward ......... 210/149 X |
| 2,377,988 | 6/1945 | Braun ................. 210/184 |
| 2,408,605 | 10/1946 | Brookes . |
| 2,680,600 | 6/1954 | Rothemund . |
| 2,693,942 | 11/1954 | Guala . |
| 2,747,555 | 5/1956 | Brunner ............... 123/32 |
| 2,902,158 | 9/1959 | Muller ............... 210/149 X |
| 2,917,285 | 12/1959 | Schack . |
| 2,942,855 | 6/1960 | Wellensiek . |
| 3,088,592 | 5/1963 | Clark ................... 210/114 |
| 3,354,872 | 11/1967 | Gratzmuller ............ 123/30 |
| 3,396,512 | 8/1968 | McMinn et al. ........ 55/170 |
| 3,568,835 | 3/1971 | Hansen ............... 210/123 X |
| 3,616,885 | 11/1971 | Priest ................. 210/180 |

(List continued on next page.)

FOREIGN PATENT DOCUMENTS

| | | |
|---|---|---|
| 495157 | 8/1953 | Canada . |
| 840643 | 1/1939 | France . |
| 356178 | 1/1938 | Italy . |
| 513329 | 2/1955 | Italy . |

OTHER PUBLICATIONS

"Flexible Fuel Filter/Water Separator for OEM Application".
"In-Line Fuel Heater"—Winterize Your Diesel Fuel—Racor Industries, Inc., (1980).
Cross, Diesel Fuel Comtamination: Causes, Cures & Prevention—Commercial Car Journal, Nov. 1981.
Racor Industries, Inc., Fuel Filter/Water Separators, 1981.

*Primary Examiner*—John Adee
*Attorney, Agent, or Firm*—Harness, Dickey & Pierce

[57] ABSTRACT

A drain system adapted for use in fuel processing devices, as well as in other fluid equipment applications, includes sensing means for detecting the presence of predetermined quantities of water or other impurities separated from the fuel, or the presence of other fluids, in an enclosure or container. Drain means are also included for discharging at least a substantial portion of one of said predetermined quantities in response to said detection of the presence thereof. The drain means is preferably actuated and deactuation by automatic control means in order to maintain said water or other impurities, or said other fluids, at or below said predetermined quantity.

37 Claims, 5 Drawing Figures

U.S. PATENT DOCUMENTS

| | | | |
|---|---|---|---|
| 3,762,548 | 10/1973 | McCabe | 210/170 |
| 3,768,730 | 10/1973 | Campbell | 165/40 |
| 3,913,543 | 10/1975 | Richard | 123/122 |
| 3,925,204 | 12/1975 | Cheysson et al. | 210/187 |
| 3,935,901 | 2/1976 | Virgil | 165/52 |
| 3,962,999 | 6/1976 | Rehm | 122/248 |
| 4,003,356 | 1/1977 | Naylor | 123/122 |
| 4,015,567 | 4/1977 | Zabenskie | 123/122 |
| 4,027,639 | 6/1977 | Amano | 123/122 |
| 4,044,742 | 8/1977 | Linder | 123/122 |
| 4,065,389 | 12/1977 | McGrew | 210/96.1 |
| 4,072,138 | 2/1978 | Hawkins et al. | 123/122 |
| 4,091,265 | 5/1978 | Richards et al. | 210/184 |
| 4,091,782 | 5/1978 | Dunnam | 123/122 |
| 4,146,002 | 3/1979 | Quinn | 123/122 |
| 4,321,136 | 3/1982 | Matsui | 210/149 X |
| 4,354,946 | 10/1982 | Warlick et al. | 210/184 |
| 4,421,090 | 12/1983 | Davis | 210/184 X |
| 4,428,351 | 1/1984 | Davis | 210/184 X |

DRAIN SYSTEM FOR FUEL PROCESSOR APPARATUS

This is a continuation-in-part of my copending application Ser. No. 287,149, filed July 27, 1981, which was a continuation-in-part of application Ser. No. 188,875, filed Sept. 19, 1980, now issued as U.S. Pat. No. 4,368,716 on Jan. 18, 1983, and of my copending application Ser. No. 435,681, filed Oct. 21, 1982, now issued as U.S. Pat. No. 4,421,090 on Dec. 20, 1983, and which was a continuation of application Ser. No. 188,875, filed Sept. 19, 1980, now issued as U.S. Pat. No. 4,368,716 on Jan. 18, 1983.

BACKGROUND AND SUMMARY OF THE INVENTION

The invention relates generally to automatic drain systems and more particularly to such drain systems for fuel processing apparatus for diesel and other types of engines.

In the past, when diesel fuel and other hydrocarbon fuels were plentiful and relatively inexpensive, there were significantly fewer problems with the quality of the fuel because of the substantial competition between sellers of the fuel. Refineries, distributors, and retailers were careful to keep water out of the fuel, and they usually did not pump out the heavy settlings from the bottom of the fuel storage tanks. In more recent times, however, because of shortages of oil and other factors, fuel suppliers can readily sell essentially all of their available oil with little difficulty. Also, in the past, kerosene and other fuels with lower cloud and pour points were blended with diesel fuel to facilitate cold weather flow and use. Fuel allocations due to government regulations, oil shortages, and other factors have now made it almost impossible to continue this practice. The result of these developments has been a distinct tendency toward lower quality fuel containing substantially more impurities, such as water, waxes, heavier compounds and particulate materials, which are very disruptive to the proper operation and starting of a diesel engine. Thus, one important object of this invention is to provide a new and improved fuel processor apparatus particularly for diesel trucks and other diesel-powered automotive vehicles to remove water and other impurities from the diesel fuel and to provide improved means for draining the water or other impurities from the processor apparatus.

An improved fuel processor apparatus broadly includes a fluid-tight chamber or canister through which the fuel flows and in which water and other impurities are separated in a lower portion of the chamber or cannister. In accordance with the invention, sensing apparatus is located in the lower portion of the chamber for detecting the presence of a predetermined quantity of water or other impurities, and a drain device is actuable, either manually or preferably automatically, in response to detection of said predetermined quantity to discharge at least a substantial portion of the water or other impurities in order to maintain them at or below said predetermined quantity. In a preferred form of the invention, automatic control means is provided for automatically actuating the drain device in response to detection of said predetermined quantity and for automatically deactuating the drain device in response to detection of a second lower quantity of such water or other impurities. In such preferred form of the invention, the quantity of water or other impurities is maintained generally between said predetermined and second quantities in order to substantially ensure that fuel is not discharged when the drain device is actuated. A temperature sensing means is preferably included for sensing the temperature in the lower portion of the chamber and is operative with the control means for automatically disabling the drain device, thereby preventing actuation of the drain device to discharge water and/or other impurities if the temperature in the lower chamber portion is below a predetermined temperature level.

Additional objects, advantages and features of the present invention will become apparent from the following description and the appended claims, taken in conjunction with the accompanying drawings.

DETAILED DESCRIPTION OF THE PREFERRED EMBODIMENTS

For purposes of illustration, FIGS. 1 through 5 of the drawings illustrate exemplary embodiments of the present invention as incorporated into a diesel fuel processing apparatus having an electric heating element and an integral filter section with a filter cartridge therein. One skilled in the art will readily recognize from the following discussion that the principles of the invention are equally applicable to other types of fluid separator devices as well as to other types of fuel processing apparatus other than that shown in the drawings, including the fuel processing devices disclosed in U.S. Pat. No. 4,368,716, issued Jan. 18, 1983, and copending application, Ser. No. 287,149, filed July 27, 1981, both of which are assigned to the same assignee as the assignee herein. The disclosures of said patent and said copending application are incorporated by reference herein.

Reference character 10 designates generally a fluid-tight open-topped cylindrical enclosure or chamber to which a gasketed fluid-tight cover 11 is removably and clampingly secured by means of a wing nut 12. A two-part tubular support and conduit assembly designated generally at 15 is positioned axially in the chamber 10 and has a bottom section 16 rigidly and threadably secured in, and upstanding from, a suitably tapped opening 17 in the bottom wall 23 of the chamber 10. The support and conduit assembly 15 has an upper section 18 rigidly and threadably attached to the lower section 16. The interiors of the tubular sections 16 and 18 communicate to define an axial passage 20 which communicates with the exterior of the chamber 10 through a fitting 22 to which a fuel outlet conduit (not shown) is adapted to be sealingly attached. The threadably interfitted male and female portions 24 and 24a, respectively, of the upper and lower sections 18 and 16 serve as means for rigidly supporting a combined baffle and filter supporting plate 25 clamped therebetween. Supporting plate 25 is of a diameter slightly less than the inside diameter of the canister or chamber, thereby providing a relatively narrow annular slot 26 for a purpose described below. The upper end of the tubular section 18 is tapped to threadably receive a stud 14 for attachment to the wing nut 12 and to provide a firm support for attachment of the cover 11.

A fuel inlet fitting 30 attached to, and extending through, the bottom wall 23 of the chamber 10 is adapted to deliver fuel to the lower chamber portion 32 below the supporting plate 25. An inlet pipe 33 connected to the fitting 30 extends upwardly within the chamber 32 and has an outlet generally tangential to the inside wall of the chamber to impart a rotary motion to the fuel therein.

The fuel flows upwardly from the lower chamber portion 32 through the gap or slot 26 into the upper chamber portion 35 above the supporting plate 25. After passing inwardly through a filter element 50, the fuel enters the upper passage portion 21 in the upper support tube section 18, by way of radially-extending holes 36, and is then conveyed downwardly through passage 20, out through the fuel discharge fitting 22, and to the fuel inlet of the engine.

An electric heating element 40 is provided in the lower chamber portion 32 and is bent to an inverted U-shaped form, having its lower ends in communication with electrical connections 42 and 44 being supported in the bottom wall 23 of the chamber. It should be noted that the upper end of the heating element 40 extends to a position close to the gap 26 through which the fuel flows to the upper chamber portion 35, which contains the filter 50. If a different type of heating unit is employed, such as the fluid-conveying tubular heater shown in the above-mentioned U.S. Pat. No. 4,368,716 and in the copending application, Ser. No. 287,419, it also projects upwardly from the bottom wall to a position close to the gap 26 so that its upper portion is positioned comparably to the bight portion 41 of the heating element 40. Such a heater, as well as other types of heaters known in the art, may be substituted for the heating element 40 shown in the drawings herein for purposes of illustration.

Figures 1, 2:
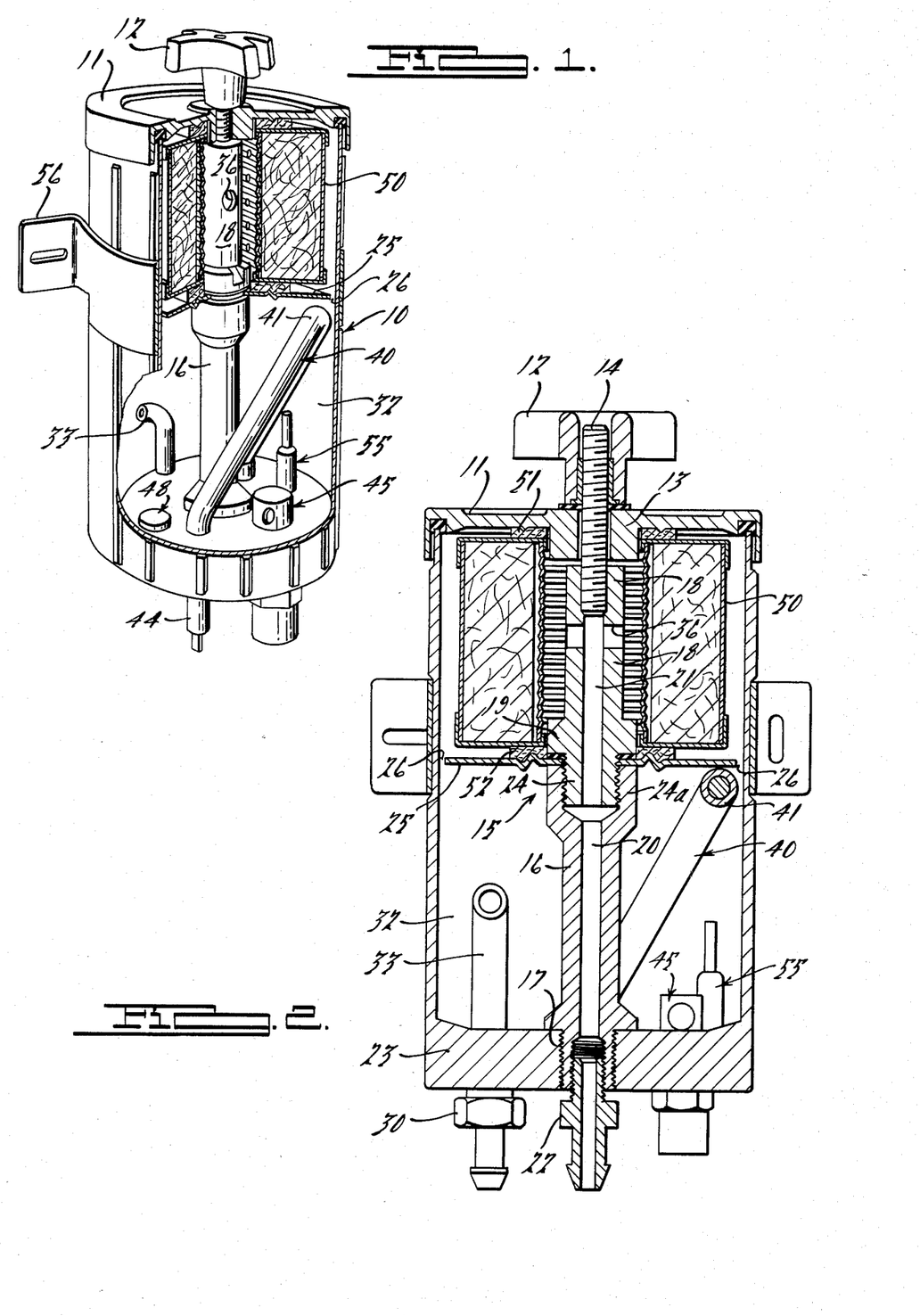
FIG. 1 is a perspective view of a fuel processing device constructed in accordance with the present invention, partially broken away.
FIG. 2 is a vertical diametric sectional view of the fuel processing device of FIG. 1.

As is best shown in FIG. 2, the bight portion 41 of the heater element 40 is slightly spaced from both the supportable plate 25 and the inner wall of the chamber 10. Thus when the ignition system of the vehicle is energized, the heating element is also energized and warmed very quickly, and consequently the fuel close to the heating element is also warmed very quickly. This is important in cold weather, because wax crystals which have formed in the cold fuel tend to readily clog the filter element 50. When the heating element 40 is initially energized, there is insufficient heat build-up to heat all of the fuel adequately to melt wax or ice crystals, but only a small amount of heat is needed to melt such crystals in a small region of the gap 26 and the lower edge of the side of the filter 50 that is adjacent the bight portion 41 of the heating element. With this heating element construction, the portion of the fuel flowing through the gap 26 at a position close to the bight portion 41 of the heating element is sufficiently heated quickly enough to maintain a clear, wax-free path or "window" through the filter 50 until the fuel processing apparatus, and the engine itself, can reach normal, steady state operating temperatures. When the fuel in the entire lower chamber portion 32 is warmed, it of course freely flows upwardly through the entire annular gap.

The bottom wall 23 of the chamber 10 also supports a drain valve means, indicated generally by reference numeral 45, for discharging water and other impurities that have been separated out into the lower chamber portion 32. Preferably the drain valve means 46 is an electric solenoid-operated valve, as shown in the drawings, but may alternately be operated manually or by pneumatic, hydraulic, or other means known to those skilled in the art. A quantity sensing means, indicated generally by reference numeral 55, is also provided for detecting the presence of various quantities of water or other impurities in the lower chamber portion 32 and for generating a signal in response thereto. The fuel processing apparatus may also optionally, if desired, include a temperature sensing means 48 for detecting and monitering the temperature of the water or other fluids or impurities in the lower chamber portion 32 and for generating a signal in response to detection of said temperatures below a predetermined value. The function and interaction of the drain valve means and the quantity sensing means, as well as the optional temperature sensing means, are discussed and explained below in connection with the schematic representations of various embodiments of the invention illustrated in FIGS. 3 through 5.

The filter element or cartridge 50 may be of a known commercially-available cylindrical drop-in type, supported and clamped between the cover and the supporting plate 25 on suitable hub portions 13 and 19 projecting from the cover and from the upper tube section 18, respectively, with suitable gasketing means being provided as indicated at 51 and 52. Alternately, other filters of the drop-in, internal, or spin-on types, as disclosed in the above-mentioned U.S. Pat. No. 4,368,716 and in the copending application, Ser. No. 287,419, for example, may be employed.

The fuel processing unit is adapted to be mounted in a suitable location by means of a bracket 56 at a position where the upper portion is readily accessible so that when desired the cover 11 may be removed and the filter element 50 replaced.

Figure 3:
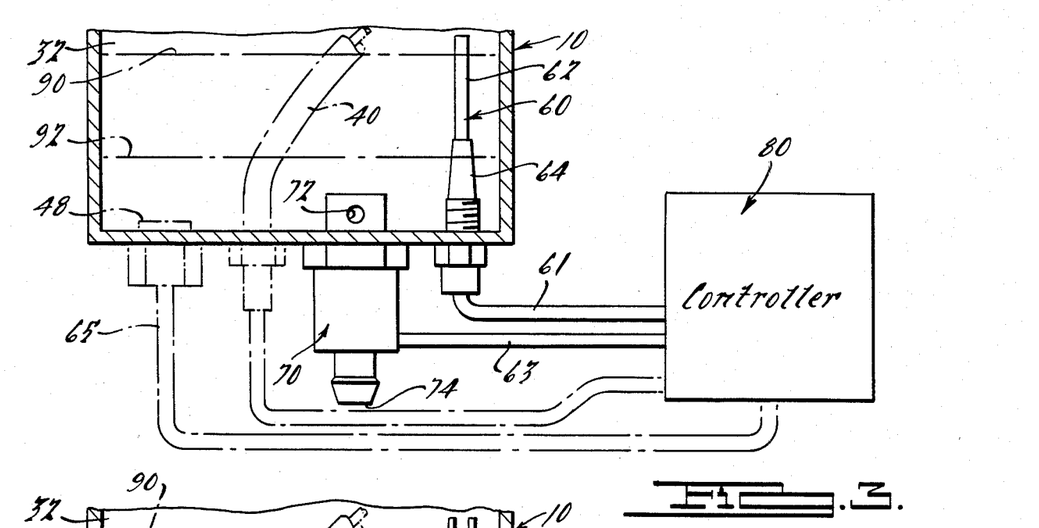
FIG. 3 is a schematic representation of one optional embodiment of an automatic drain system in accordance with the present invention.
Figure 4:
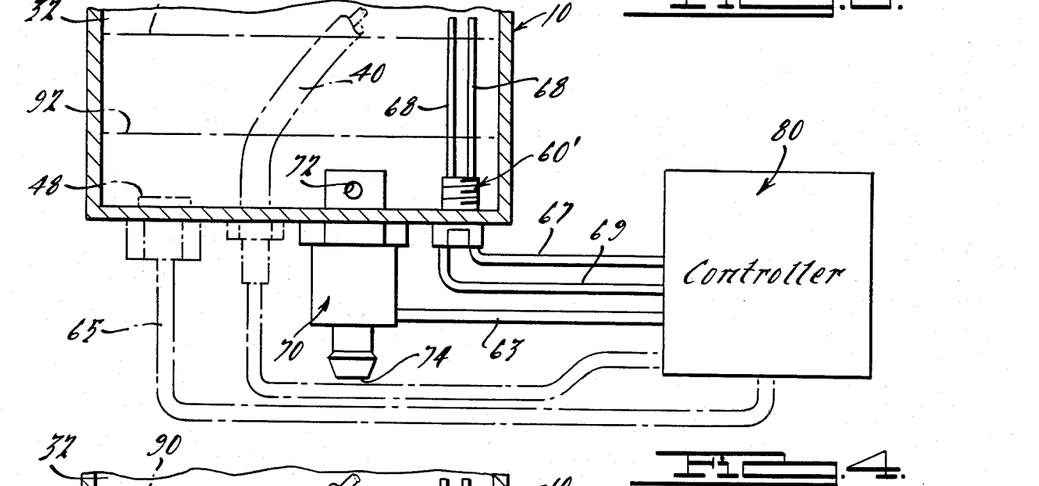
FIG. 4 is a schematic representation of another optional embodiment of an automatic drain system in accordance with the present invention.
Figure 5:
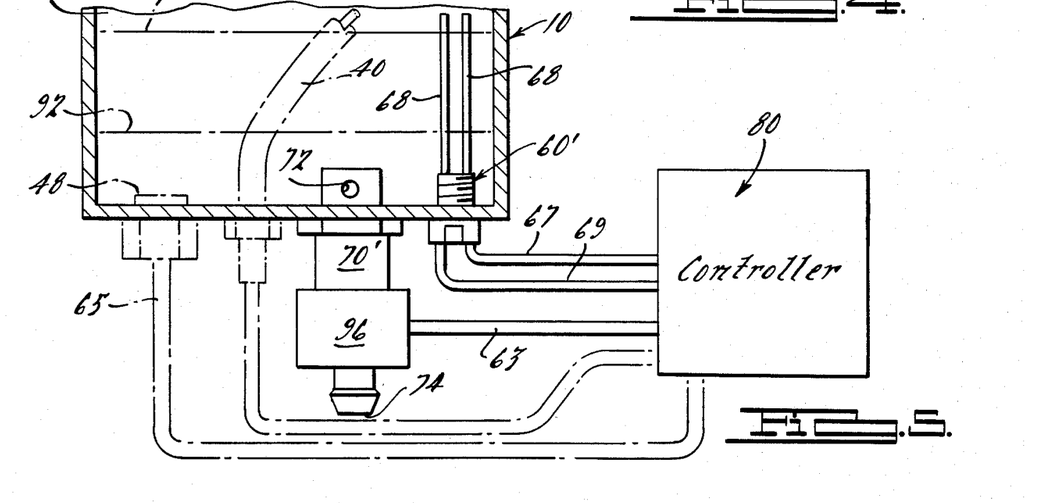
FIG. 5 is a schematic representation of still another optional embodiment of an automatic drain system in accordance with the present invention.

FIGS. 3 through 5 schematically illustrate exemplary variations of the preferred form of the present invention. In the variation of FIG. 3, the lower portion 32 of the chamber 10, which is under a positive pressure, includes a quantity sensing means and a drain valve means. The sensing means preferably comprises a fluid level sensor 60 having an electrical probe 62, a lower portion of which is surrounded by insulating means 64, extending generally upwardly therein. The drain valve means preferably comprises a solenoid-operated valve 70 located at the bottom of the chamber and having at least one inlet 72 and an outlet 74, which are configured such that the valve 70 provides fluid communication between the interior of the lower chamber portion 32 and the exterior of the chamber 10 when actuated and prevents such fluid communication when deactuated.

The fluid level sensor 60 is adapted to generate distinct signals when the electrical probe 62 is exposed at various points along its vertical length or height to one or more fluids having distinct electrical characteristics, such as electrical conductivity or resistance, for example. The sensor 60 is connected by way of an electrical conductor 61 to an automatic controller 80, and similarly the solenoid-operated valve 70 is connected by way of electrical conductor 63 to the controller 80.

In operation of the FIG. 3 variation, water and/or other impurities are separated from the fuel and settle to the bottom of the lower chamber portion 32, thereby creating an interface between the fuel and the water and/or other impurities. Since the fuel and such water and/or impurities typically have different electrical characteristics, the signal generated by the probe 62 changes as the level of such interface moves up and down its vertical length or height. Such signal therefore changes as greater quantities of water and/or other impurities are separated from the fuel in the lower chamber portion 32, ranging from a condition wherein the interface is at a level below the upper end of the insulating means 64 and the probe 62 is exposed only to fuel, to a condition wherein the interface has risen to various intermediate positions on the probe 62 so that the probe is exposed to varying amounts of fuel and water and/or other impurities, and finally to a condition wherein the interface is at or above the upper end of the probe and the probe is exposed only to water/impurities.

The controller 80, which preferably comprises a conventional microprocessor unit or other electronic circuitry known to those skilled in the art, is adapted to receive, and differentiate between, the varying signals from the sensor 60 as the level of the above-mentioned interface changes. Thus the controller 80 is pre-set, adapted, or programmed to cause the solenoid-operated valve 70 to be actuated at a predetermined high level of such interface between thhe fuel and the water and/or other impurities, such as at the level 90. The controller 80 is also pre-set, adapted, or programmed such that when the valve 70 is actuated, the water and/or other impurities are discharged through the outlet 74 of the valve 70 until the level of the interface recedes to a predetermined low interface level, such as the level 92, at which time the valve 70 is deactuated and closed. Thus the quantity of water and/or other impurities in the chamber 10 is maintained generally between the predetermined levels 90 and 92. It should be noted that the level 92 should be established so that the interface is above the inlet 72 of the valve 70 in order to avoid dumping or discharging fuel along with the water and/or other impurities.

If desired in the FIG. 3 variation, as well as in any of the other variations or embodiments of the invention shown and described herein, the temperature sensing means 48 may optionally be included and connected to the controller 80, such as by way of electrical conductor 65, to override and prevent the controller 80 from causing the valve 70 to discharge the water and/or other impurities if the temperature in the lower chamber portion 32 is below a predetermined temperature level. Such predetermined temperature level should be slightly above the freezing point of the mixture of water and other impurities in order to avoid damage to, or improper operation of, the valve 70 due to frozen solids being introduced therein. Additionally, if desired, the heating element 40 may optionally be connected to a power source (not shown) by way of the controller 80 so that the controller may also be used to regulate the power to the heating element in response to signals from the temperature sensing means 48. It should be noted that the temperature sensing means 48 may comprise a thermostat device, a thermistor, or other such temperature sensing devices known to those skilled in the art.

The variation of the present invention represented schematically in FIG. 4 is substantially similar to that described above in connection with FIG. 3, except that the exemplary single-probe fluid level sensor 60 of FIG. 3 is replaced by an exemplary dual-probe fluid level sensor 60'. Fluid level sensor 60' includes a pair of electrical probes 68 extending generally upwardly in the lower chamber portion 32 and located closely adjacent to one another. Thus, rather than the single-probe sensor 60 measuring electrical conductivity or resistance, for example, between the single probe and the wall of the chamber 10 or some other electrode therein, the dual-probe sensor 60' measures such electrical quantities between the two probes 68, themselves. Because the probes 68 are located close to each other relative to the distance between the probes and the wall of the chamber, it is believed that the dual-probe sensor 60' is capable of more accurate measurements of the level of the interface between the fuel and the water and/or other impurities. Such increased accuracy is believed to exist especially when the fuel processor apparatus is disposed at an attitude such that the fluids therein are not substantially horizontal, such as when a vehicle having the apparatus thereon is travelling on uneven terrain or is engaged in sharp cornering maneuvers, for example.

The fluid level sensor 60' is adapted to generate distinct signals when the probes 68 are exposed to one or more fluids extending between them at various corresponding levels along their lengths. Thus because the fuel and the water and/or other impurities typically have different electrical characteristics, such as conductivity and resistance between the probes 68, for example, the sensor 60' generates a signal that changes as the level of the interface between the fuel and the water or other impurities moves up and down at various levels on the probes 68. Thus, such signal changes, as is described above in connection with FIG. 3, as greater quantities of the water and/or other impurities are separated from the fuel in the lower chamber portion 32. As is also described above, the controller 80 is pre-set, adapted, or programmed to receive and differentiate between the varying signals from the sensor 60' in order to actuate the solenoid-operated valve 70 at a predetermined high level of the interface, such as at the level 90, and to deactuate the solenoid-operated valve at a predetermined low level, such as the level 92.

The variation of the present invention which is represented schematically in FIG. 5 is substantially similar to those shown and described above in connection with FIGS. 3 and 4, but is particularly adapted for use in a chamber 10 that is under a negative pressure. Such negative pressure at least inhibits, if not prevents, the water and/or other impurities from being discharged under the force of gravity through the solenoid-operated valve 70, as in the positive-pressure arrangements shown schematically in FIGS. 3 and 4. Therefore, the solenoid-operated valve 70' in FIG. 5 includes a pump means 96 incorporated therein. Thus, when the controller 80 receives a signal from the fluid level sensor 60 or 60', which corresponding to an interface level at the predetermined level 90, the controller 80 causes the solenoid-operated valve 70' and the pump means 96, which is preferably a positive displacement pump, to be activated to forcibly discharge the water or other impurities from the chamber 10. When the interface level reaches the level indicated at 92, the controller 80 causes the solenoid-operated valve 70' and the pump means 96 to be deactuated. Alternately, the controller 80 may be pre-set, adapted, or programmed to actuate the solenoid-operated valve 70' and the pump means 96 only for a predetermined time period after the fluid level sensor senses an interface level at the predetermined high level 90. In still another alternate version of the arrangement shown in FIG. 5, such predetermined timed actuation of the solenoid-operated valve 70' and the pump means 96 may be used in conjunction with the above-described actuation and deactuation in response to interface levels 90 and 92, respectively, and therefore serve as a redundant back-up feature for such normal operation. It should be noted that the arrangement shown schematically in FIG. 5 may alternately include either a single-probe sensor as in FIG. 3 or a multi-probe sensor as in FIG. 4.

It should be emphasized that although the present invention is shown and described herein, for purposes of illustration, as incorporated in a fuel processing apparatus for separating water and/or other impurities from the fuel, the invention is not so limited. One skilled in the art will readily recognize that the invention, as described and illustrated herein, has wide-spread applicability and adaptability in any number of devices or systems in which materials having distinct electrical characteristics are to be monitered and drained from an enclosure or container, for example.

The foregoing discussion discloses and describes exemplary embodiments and variations of the present invention. One skilled in the art will readily recognize from such discussion that various changes, modifications and other variations may be made therein without departing from the spirit and scope of the invention as defined in the following claims.

What is claimed is:

1. In a fuel processor means operative to separate out water or other impurities from the fuel, said fuel processor means including a chamber adapted to receive said fuel flowing therethrough, said fuel and said water or other impurities being separated in a lower portion of said chamber, the improvement comprising:
   quantity sensing means located in said lower portion of said chamber for detecting the presence of at least one predetermined quantity of said water or other impurities therein;
   drain means actuable to discharge a substantial portion of said water or other impurities from said chamber in response to the detection of said predetermined quantity of said water or other impurities by said quantity sensing means, whereby the quantity of said water or other impurities in said chamber is maintained at or below said predetermined quantity; and
   temperature sensing means located in said lower portion of said chamber for sensing the temperature of said water or other impurities in said lower portion of said chamber and for disabling said drain means in response to detection of a water temperature below a predetermined temperature level.

2. The improvement according to claim 1, wherein said quantity sensing means is also adapted to detect the presence of a second quantity of said water or other impurities, said improvement further including control means for causing actuation of said drain means in response to said detection of said predetermined quantity of water or other impurities in said chamber and for causing deactuation of said drain means in response to detection of said second quantity of water or other impurities in said chamber, said predetermined quantity being greater than said second quantity, whereby the quantity of said water or other impurities is maintained generally between said predetermined quantity and said second quantity.

3. The improvement according to claim 2, wherein said drain means is actuated and deactuated automatically by said control means in response to said detection of said respective predetermind and second quantities of water or other impurities, whereby the quantity of water or other impurities is automatically maintained generally between said predetermined quantity and said second quantity even when said fuel process is unattended.

4. The improvement according to claim 1, wherein said quantity sensing means includes probe means protruding in a generally vertical direction into said lower portion of said chamber, said probe means being adapted for detecting the presence of a predetermined level of said water or other impurities therein generally corresponding to said predetermined quantity and for generating a high-level signal to indicate the presence of said predetermined quantity.

5. The improvement according to claim 4, further comprising automatic control means for receiving said high-level signal and for automatically actuating said drain means in response to said high-level signal.

6. The improvement according to claim 5, wherein said probe means is further adapted for detecting the presence of a level of said water or other impurities lower than said predetermined level in said lower portion of said chamber and for generating a low-level signal to indicate the presence of said lower level, said automatic control means further being adapted to automatically deactuate said drain means in response to said low-level signal, whereby the quantity of said water or other impurities is automatically maintained generally between said predetermined quantity and a lesser quantity corresponding to said lower level.

7. The improvement according to claim 6, wherein said probe means comprises at least one elongated probe protruding in a generally upwardly direction into said lower portion of said chamber, said probe being adapted to generate distinct signals when exposed at various points along its length to one or more fluids having distinct electrical characteristics, said automatic control means being adapted to differentiate between said distinct signals in oder to actuate and deactuate said drain means in response to said high-level and low-level signals, respectively.

8. The improvement according to claim 7, wherein said drain means includes a solenoid-operated valve adapted to provide communication therethrough between the interior of said lower portion of said chamber and the exterior of said fuel processor means to discharge said substantial portion of said water or other impurities when said solenoid-operated valve is actuated, said solenoid-operated valve further being adapted to prevent said communication when said solenoid-operated valve is deactuated.

9. The improvement according to claim 8, wherein said drain means further includes pumping means operatively connected to said solenoid-operated valve, said pumping means being actuated and deactuated by said control means in conjunction with respective actuation and deactuation of said solenoid-operated valve.

10. The improvement according to claim 8, wherein said probe means comprises a pair of said elongated probes protruding generally upwardly into said lower portion of said chamber, said probes being separated but located closely adjacent to one another relative to the distance from said probes to the wall of said chamber and being adapted to generate distinct signals when exposed at various corresponding levels along each of their lengths to one or more fluids which have distinct electrical characteristics and extend between said probes.

11. The improvement according to claim 3, wherein said temperature sensing means located in said lower portion of said chamber is adapted to generate a low temperature signal in response to detection of a temperature of said water or other impurities below said predetermined temperature level in said lower portion of said chamber, said control means being adapted to receive said low-temperature signal and to automatically disabling said drain means in response thereto.

12. The improvement according to claim 1, wherein said predetermined temperature level is approximately 34 F., whereby said temperature sensing means substantially disables and prevents improper operation of said drain means resulting from ice being introduced thereinto.

13. A fuel processing apparatus for use on trucks, automobiles, and the like, said apparatus being operative to preheat the fuel to separate out water or other impurities from the fuel, said apparatus comprising in combination:
 a fluid-tight chamber having a fuel inlet and a fuel outlet, said fuel and said water or other impurities being substantially separated in a lower portion of said chamber;
 heating means in said chamber for preheating said fuel;
 filter means operatively connected with said chamber for filtering said fuel after said water and other impurities have been substantially separated;
 quantity sensing means located in said lower portion of said chamber for detecting the presence of various quantities of said water or other impurities therein;
 drain valve means actuable to provide fluid communication between the interior of said lower portion of said chamber and the exterior of said chamber in order to discharge a substantial portion of said water and other impurities therefrom, said drain valve means further being deactuable to prevent said fluid communication;
 automatic control means for actuating said drain valve means in response to detection by said quantity sensing means of the presence of a first predetermined quantity of said water or other impurities in said lower portion of said chamber and for deactuating said drain valve means in response to detection by said quantity sensing means of the presence of a second lesser predetermined quantity of said water or other impurities in said lower portion of said chamber whereby the quantity of said water or other impurities is maintained generally between said first and second predetermined quantities; and
 temperature sensing means located in said lower portion of said chamber for sensing the temperature of said water or other impurities therein and for disabling said drain means in response to detection of a water temperature below a predetermined temperature level.

14. A fuel processing apparatus according to claim 13, wherein said quantity sensing means includes at least one elongated probe extending generally upwardly into said lower portion of said chamber, said probe being adapted to generate distinct signals when exposed at various points along its length to one or more fluids having distinct electrical characteristics, said automatic control means being adapted to differentiate between said distinct signals in order to actuate said drain valve means in response to a first level of said water or other impurities and to deactuate said drain valve means in response to a second level of said water or other impurities, said first and second levels corresponding to said first and second predetermined quantities, respectively.

15. A fuel processing apparatus according to claim 14, wherein said drain valve means is solenoid-operated.

16. A fuel processing apparatus according to claim 15, wherein said drain valve means further includes pumping means operatively connected thereto, said pumping means being actuated and deactuated by said automatic control means in conjunction with respective actuation and deactuation of said drain valve means.

17. A fuel processing apparatus according to claim 14, wherein said quantity sensing means comprises a pair of said elongated probes protruding generally upward into said lower portion of said chamber, said probes being separate but located closely adjacent to one another relative to the distance from said probes to the wall of said chamber and being adapted to generate distinct signals when exposed at various corresponding levels along each of their lengths to one or more fluids which have distinct electrical characteristics and extend between said probes.

18. A fuel processing apparatus according to claim 17, wherein said drain valve means is solenoid-operated.

19. A fuel processing apparatus according to claim 18, wherein said drain valve further includes pumping means operatively connected thereto, said pumping means being actuated and deactuated by said automatic control means in conjunction with respective actuation and deactuation of said drain valve.

20. A fuel processing apparatus according to claim 14, wherein said temperature sensing means located in said lower portion of said chamber is adapted to generate a low-temperature signal in response to detection of temperatures below a predetermined temperature level in said lower portion of said chamber, said control means being adapted to receive said low-temperature signal and to automatically disable said drain means in response thereto.

21. A fuel processing apparatus according to claim 13, wherein said predetermined temperature level is approximately 34 F., whereby said control means substantially disables and prevents improper operation of said drain means resulting from ice being introduced thereinto.

22. An automatic drain system for a chamber having at least one fluid therein, said system comprising:
 quantity sensing means located in a lower portion of said chamber for detecting the presence of at least one predetermined quantity of said fluid therein;
 drain means actuable to discharge a substantial portion of said fluid from said chamber in response to the detection of said predetermined quantity of said fluid by said quantity sensing means, whereby the quantity of said fluid in said chamber is maintained at or below said predetermined quantity; and
 temperature sensing means located in said lower portion of said chamber for sensing the temperature of said fluid therein and for disabling said drain means in response to detection of a fluid temperature below a predetermined temperature level.

23. An automatic drain system according to claim 22, wherein said quantity sensing means is also adapted to detect the presence of a second quantity of said fluid, said system further including automatic control means for causing actuation of said drain means in response to said detection of said predetermined quantity of said fluid in said chamber and for causing deactuation of said drain means in response to detection of said second quantity of said fluid in said chamber, said predetermined quantity being greater than said second quantity, whereby the quantity of said fluid in said chamber is maintained generally between said predetermined quantity and said second quantity.

24. An automatic drain system according to claim 23, wherein said quantity sensing means includes at least one elongated probe extending generally upwardly into said lower portion of said chamber, said probe being adapted to generate distinct signals when exposed at various points along its length to one or more fluids having distinct electrical characteristics, said automatic control means being adapted to differentiate between said distinct signals in order to actuate said drain means in response to a first level of said fluid and to deactuate said drain means in response to a second level of said fluid, said first and second levels corresponding to said first and second predetermined quantities, respectively.

25. An automatic drain system according to claim 24 wherein said drain means includes a solenoid-operated valve.

26. An automatic drain system apparatus according to claim 25, wherein said drain means further includes pumping means operatively connected thereto, said pumping means being actuated and deactuated by said automatic control means in conjunction with respective actuation and deactuation of said drain means.

27. An automatic drain system according to claim 24, wherein said quantity sensing means comprises a pair of said elongated probes protruding generally upwardly into said lower portion of said chamber, said probes being separate but located closely adjacent to one another relative to the distance from said probes to the wall of said chamber and being adapted to generate distinct signals when exposed at various corresponding levels along each of their lengths to one or more fluids which have distinct electrical characteristics and extend between said probes.

28. An automatic drain system according to claim 27, wherein said drain means includes a solenoid-operated valve.

29. An automatic drain system according to claim 28, wherein said drain means further includes pumping means operatively connected thereto, said pumping means being actuated and deactuated by said automatic control means in conjunction with respective actuation and deactuation of said drain means.

30. The improvement according to claim 1, further including heater means selectively actuable for heating said fuel in said chamber, said temperature sensing means being adapted to cause actuation of said heater means in response to detection of said temperature below said predetermined temperature level.

31. A fuel processing apparatus according to claim 13, wherein said temperature sensing means is adapted to cause actuation of said heating means in response to detection of said temperature below said predetermined temperature level.

32. In a fluid fuel processor device operative to separate water or other impurities from the fuel, the fuel processor device including a chamber adapted to receive the fuel flowing therethrough, the fuel and the water or other impurities being separated in a lower portion of the chamber wherein an interface is created between the fuel and the water or other impurities, the fuel having a different resistance or electrical conductivity from that of the water or other impurities, the improvement comprising:
   drain means located in the lower portion of the chamber and actuable for providing fluid communication between the lower portion of the chamber and the exterior of the chamber;
   quantity sensing means located in the lower portion of the chamber for detecting the level of the interface between the fuel and the water or other impurities, said quantity sensing means including at least one elongated electric probe protruding generally vertically into the lower portion of said chamber, said probe having an insulated lower probe portion and an uninsulated upper probe portion, said upper probe portion being adapted to generate distinct electrical signals as it is exposed along its length to the interface between the fuel and the water or other impurities, said distinct electrical signals varying continuously along the length of said uninsulated upper probe portion as the level of the interface changes,
   automatic control means adapted to receive said electrical signals from said probe and to actuate said drain means in response to a first electrical signal corresponding to a predetermined high level of the interface and to deactuate said drain means in response to a second electrical signal corresponding to a predetermined low level of the interface,
   whereby the quantity of said water or other impurities in the lower portion of the chamber is maintained at or below said predetermined high level, and
   temperature sensing means in said chamber for detecting the temperature therein, said control means being adapted to disable said drain means in response to detection by said temperature sensing means of a temperature at or below a predetermined temperature level.

33. The improvement according to claim 32, wherein said predetermined temperature level is approximately 34° F.

34. The improvement according to claim 32, comprising a pair of said elongated electric probes, said probes being physically separate and spaced apart and extending generally parallel to one another in said generally vertical direction, the space between said separate probes being substantially less than the distance from said probes to the wall of the chamber such that the level of contact of the interface with the uninsulated probe portion of each of said probes is approximately the same even under conditions wherein the probes are not substantially perpendicular to the interface.

35. A unitary processing and filtering unit, particularly for diesel fuel and operative to separate out water-impurities from the fuel, comprising a housing including a lower portion defining a combined heating and sediment chamber having a fuel inlet, a concentric annular shaped filtering means carried by an upper portion of said housing and having a fuel outlet, means defining a passage for conducting fluid from said chamber to the filtering means, heating means in said lower portion operative to heat the incoming fuel by direct contact therewith in said chamber, said heating means including a heated portion in close proximity to said passage, said heating means extending through a substantial part of the lower portion, said water-impurities being separated out in said lower portion, quantity sensing means located in said lower portion of said chamber for detecting the presence of at least one predetermined quantity of said water-impurities therein, and drain means actuable to discharge a substantial portion of said water-impurities from said lower portion in response to the detection by said quantity sensing means, whereby the quantity of said water-impurities is maintained at or below said predetermined quantity.

36. A fuel processor means for use with diesel engines on diesel trucks, automobiles, and the like, and whereby said fuel processor means is operative to preheat the diesel fuel and to separate out water-impurities from the diesel fuel, comprising, a vertically oriented tubular vessel means operative for separating water-impurities out of the fuel in a lower portion thereof, inlet conduit means to introduce hot liquid from the engine, another conduit means passing through a central portion of said vessel for transmitting the hot liquid therethrough, outlet conduit means for recirculating the hot liquid back through the engine system, a second inlet conduit means for introducing fuel to the interior of the vessel near the midpoint thereof for flow therethrough and such that this inlet is above the level of water-impurities being collected in the vessel, a second outlet conduit means for the fuel near the top of the vessel for transmitting the water-free fuel to the engine, vent means near the top of the vessel for venting the vessel when desired, quantity sensing means located in said lower portion for detecting the presence of at least one predetermined quantity of said water-impurities therein, and drain means actuable to discharge a substantial portion of said water-impurities from said chamber in response to the detection of said predetermined quantity of said water-impurities by said quantity sensing means, whereby the quantity of said water-impurities in said chamber is maintained at or below said predetermined quantity.

37. A fuel processor means for use with diesel engines on diesel trucks, automobiles, and the like, and whereby said fuel processor means is operative to preheat the diesel fuel and to separate out water-impurities from the diesel fuel, comprising, a vertically oriented tubular vessel means operative for separating water-impurities out of the fuel in a lower portion thereof, inlet conduit means to introduce hot liquid from the engine, another conduit means passing through a central portion of said vessel for transmitting the hot liquid therethrough, outlet conduit means for recirculating the hot liquid back through the engine system, a second inlet conduit means for introducing fuel to the interior of the vessel near the midpoint thereof for flow therethrough and such that this inlet is above the level of water-impurities being collected in the vessel, a second outlet conduit means for the fuel near the top of the vessel for transmitting the water-free fuel to the engine, quantity sensing means located in said lower portion of said chamber for detecting the presence of at least one predetermined quantity of said water-impurities therein, and drain means actuable to discharge a substantial portion of said water-impurities from said chamber in response to the detection of said predetermined quantity of said water or other impurities by said quantity sensing means, whereby the quantity of said water-impurities in said chamber is maintained at or below said predetermined quantity.

* * * * *

UNITED STATES PATENT AND TRADEMARK OFFICE
CERTIFICATE OF CORRECTION

PATENT NO. : 4,495,069
DATED : January 22, 1985
INVENTOR(S) : Leland L. Davis

It is certified that error appears in the above-identified patent and that said Letters Patent is hereby corrected as shown below:

Col. 5, line 32, "thhe" should be —the— (first occurrence)

Col. 8, line 8, "predetermind" should be —predetermined—

Col. 8, line 48, "oder" should be —order—

Col. 10, line 23-24 (Claim 17) "upward" should be —upwardly—

Signed and Sealed this

Twenty-sixth Day of November 1985

[SEAL]

Attest:

DONALD J. QUIGG

Attesting Officer

Commissioner of Patents and Trademarks